United States Patent

Hamaguchi et al.

(10) Patent No.: US 10,236,537 B2
(45) Date of Patent: Mar. 19, 2019

(54) NON-AQUEOUS ELECTROLYTE SECONDARY BATTERY

(71) Applicant: TOYOTA JIDOSHA KABUSHIKI KAISHA, Toyota-shi, Aichi (JP)

(72) Inventors: Hiroshi Hamaguchi, Toyota (JP); Masaru Ishii, Miyoshi (JP); Hideyo Ebisuzaki, Toyota (JP); Toru Nakai, Kiyosu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 118 days.

(21) Appl. No.: 14/690,815

(22) Filed: Apr. 20, 2015

(65) Prior Publication Data

US 2015/0303526 A1 Oct. 22, 2015

(30) Foreign Application Priority Data

Apr. 21, 2014 (JP) .................................. 2014-087162

(51) Int. Cl.
*H01M 10/00* (2006.01)
*H01M 10/42* (2006.01)
(Continued)

(52) U.S. Cl.
CPC ....... *H01M 10/4235* (2013.01); *H01M 2/345* (2013.01); *H01M 10/0567* (2013.01);
(Continued)

(58) Field of Classification Search
CPC .................. H01M 10/0567; H01M 10/4235
See application file for complete search history.

(56) References Cited

U.S. PATENT DOCUMENTS 5,776,627 A 7/1998 Mao et al.
6,632,572 B1 10/2003 Takahashi et al.
(Continued)

FOREIGN PATENT DOCUMENTS

CN 1279520 A 1/2001
CN 1430306 A 7/2003
(Continued)

OTHER PUBLICATIONS

Machine translation of CN 1430306 A, "Nonaqueous electrolyte and lithium secondary battery using the electrolyte", obtained Jan. 23, 2018 (Year: 2013).*

(Continued)

*Primary Examiner* — Nicholas P D'Aniello
(74) *Attorney, Agent, or Firm* — Sughrue Mion, PLLC (57) ABSTRACT

Provided is a non-aqueous electrolyte secondary battery that can achieve both battery characteristics during normal usage and resistance to overcharging at high levels. In this non-aqueous electrolyte secondary battery, an electrode body, which includes a positive electrode and a negative electrode, and a non-aqueous electrolyte are housed in a battery case. The battery case is provided with a current interrupt mechanism that activates when the pressure inside the case increases. The non-aqueous electrolyte contains cyclohexylbenzene and 4,4'-difluorobiphenyl as gas generating agents that decompose and generate gas when the battery reaches an overcharged state. In addition, when the overall quantity of the non-aqueous electrolyte is taken to be 100 mass %, a ratio of the content (mass %) of the 4,4'-difluorobiphenyl (W2) relative to the content (mass %) of the cyclohexylbenzene (W1) (W2/W1) is 0.025 to 0.25.

5 Claims, 5 Drawing Sheets (51) Int. Cl.
*H01M 10/0567* (2010.01)
*H01M 2/34* (2006.01)
*H01M 10/0587* (2010.01)

(52) U.S. Cl.
CPC .... *H01M 10/0587* (2013.01); *H01M 2200/20* (2013.01); *H01M 2220/20* (2013.01); *H01M 2300/0025* (2013.01)

(56) References Cited

U.S. PATENT DOCUMENTS

| | | | |
|---|---|---|---|
| RE43,276 E | 3/2012 | Kweon et al. | |
| 9,559,383 B2* | 1/2017 | Morita | H01M 10/0567 |
| 9,876,227 B2* | 1/2018 | Oyama | H01M 4/525 |
| 2002/0028380 A1 | 3/2002 | Tanjo et al. | |
| 2003/0118912 A1 | 6/2003 | Watanabe et al. | |
| 2006/0275666 A1 | 12/2006 | Chang et al. | |
| 2007/0015048 A1 | 1/2007 | Lee et al. | |
| 2007/0026312 A1 | 2/2007 | Imachi et al. | |
| 2007/0048607 A1 | 3/2007 | Nakashima et al. | |
| 2008/0102353 A1 | 5/2008 | Takezawa et al. | |
| 2008/0254355 A1 | 10/2008 | Muraoka et al. | |
| 2008/0268338 A1 | 10/2008 | Lee et al. | |
| 2008/0318133 A1 | 12/2008 | Matsuyama et al. | |
| 2009/0130561 A1 | 5/2009 | Matsumoto et al. | |
| 2009/0325069 A1 | 12/2009 | Anada et al. | |
| 2010/0136428 A1 | 6/2010 | Yokoyama et al. | |
| 2010/0143773 A1 | 6/2010 | Honbou | |
| 2010/0255382 A1 | 10/2010 | Kim et al. | |
| 2010/0310944 A1 | 12/2010 | Kang et al. | |
| 2011/0168944 A1 | 7/2011 | Chang et al. | |
| 2011/0274971 A1 | 11/2011 | Sakamoto et al. | |
| 2011/0311879 A1* | 12/2011 | Yamada | H01M 4/366 429/303 |
| 2012/0064390 A1 | 3/2012 | Wang et al. | |
| 2012/0208070 A1 | 8/2012 | Nakashima et al. | |
| 2013/0136964 A1 | 5/2013 | Li et al. | |
| 2013/0252108 A1 | 9/2013 | Richards et al. | |
| 2015/0010784 A1* | 1/2015 | Takahata | H01M 10/0525 429/7 |

FOREIGN PATENT DOCUMENTS

| | | |
|---|---|---|
| CN | 101213703 A | 7/2008 |
| CN | 101286576 A | 10/2008 |
| CN | 101529642 A | 9/2009 |
| EP | 1065744 A2 | 1/2001 |
| EP | 2469624 A1 | 6/2012 |
| JP | 2000021443 A | 1/2000 |
| JP | 2001085057 A | 3/2001 |
| JP | 2002-117895 A | 4/2002 |
| JP | 2002151055 A | 5/2002 |
| JP | 2002-313415 A | 10/2002 |
| JP | 2003203636 A | 7/2003 |
| JP | 2003-338317 A | 11/2003 |
| JP | 2003338277 A | 11/2003 |
| JP | 2004-063114 A | 2/2004 |
| JP | 2005-259680 A | 9/2005 |
| JP | 2006324235 A | 11/2006 |
| JP | 200897879 A | 4/2008 |
| JP | 2009-206105 A | 9/2009 |
| JP | 2010-507213 A | 3/2010 |
| JP | 2010160984 A | 7/2010 |
| JP | 201384400 A | 5/2013 |
| JP | 2013-235653 A | 11/2013 |
| KR | 20010007570 A | 1/2001 |
| KR | 100509968 B1 | 8/2005 |
| WO | 2011021644 A1 | 2/2011 |

OTHER PUBLICATIONS

An Office Action dated Mar. 17, 2016, which issued during the prosecution of U.S. Appl. No. 14/379,610.
An Office Action dated Aug. 16, 2016, which issued during the prosecution of U.S. Appl. No. 14/379,610.
An Office Action dated Dec. 20, 2016, which issued during the prosecution of U.S. Appl. No. 14/379,610.
An Advisory Action dated Sep. 26, 2017, which issued during the prosecution of U.S. Appl. No. 14/379,610.
An Office Action dated Jun. 2, 2017, which issued during the prosecution of U.S. Appl. No. 14/379,610.
An Office Action dated Jan. 11, 2018, which issued during the prosecution of U.S. Appl. No. 14/379,610.
Notice of Allowance dated Jul. 12, 2018, which issued during the prosecution of U.S. Appl. No. 14/379,610.
Notice of Allowance dated Oct. 3, 2018, which issued during the prosecution of U.S. Appl. No. 14/379,610.
An Office Action dated Apr. 5, 2016, which issued during the prosecution of U.S. Appl. No. 14/372,299.
Notice of Allowance dated Sep. 21, 2016, which issued during the prosecution of U.S. Appl. No. 14/372,299.
An Office Action dated Jun. 5, 2017, which issued during the prosecution of U.S. Appl. No. 14/414,809.
Notice of Allowance dated Nov. 8, 2017, which issued during the prosecution of U.S. Appl. No. 14/414,809.
Notice of Allowance dated Oct. 3, 2018 from the United State Patent and Trademark Office in U.S. Appl. No. 14/379,610.

* cited by examiner

NON-AQUEOUS ELECTROLYTE SECONDARY BATTERY

TECHNICAL FIELD

The present invention relates to a non-aqueous electrolyte secondary battery. More specifically, the present invention relates to a non-aqueous electrolyte secondary battery provided with a pressure-activated current interrupt mechanism.

Moreover, the present application claims priority on the basis of Japanese Patent Application No. 2014-087162, which was filed on 21 Apr. 2014, and all the details of that application are incorporated by reference in the present Description.

BACKGROUND ART

Non-aqueous electrolyte secondary batteries such as lithium ion secondary batteries are lighter and have higher energy densities than existing batteries, and can therefore be advantageously used in power sources for propelling vehicles such as electric vehicles and hybrid vehicles or in so-called portable power sources for personal computers, hand-held devices and the like.

Such batteries are used in a state whereby the voltage is generally controlled so as to be held within a prescribed range (for example, 3.0 to 4.1 V), but if a higher voltage than normal is supplied due to improper operation or the like, the voltage may exceed the prescribed voltage and overcharging may occur. If overcharging occurs, gases may be generated due to the non-aqueous electrolyte decomposing and the temperature inside the battery may rise due to heat generated by the active material.

As technique for solving this problem, Patent Literature 1 to 3, for example, have disclosed adding an aromatic compound, which has an oxidation potential that is higher than the maximum charging potential of a positive electrode, to a non-aqueous electrolyte. When the battery reaches an overcharged state, the aromatic compound is electrochemically polymerized and a high resistance coating film is formed on the surface of the positive electrode. In this way, migration of lithium ions is suppressed and development of the overcharging can be halted.

CITATION LIST

Patent Literature

[Patent Literature 1] Japanese Patent Application Publication No. 2010-507213
[Patent Literature 2] Japanese Patent Application Publication No. 2002-313415
[Patent Literature 3] Japanese Patent Application Publication No. 2002-117895

SUMMARY OF INVENTION

In addition, techniques widely used in high capacity type batteries such as those used as power sources for vehicle propulsion and the like include providing a pressure-activated current interrupt mechanism (CID) in the battery case and incorporating, in the non-aqueous electrolyte, a compound that decomposes and generates a gas (hereinafter referred to as a "gas generating agent") when the battery reaches an overcharged state. If this battery reaches an overcharged state, the gas generating agent is oxidized on the surface of the positive electrode, thereby generating hydrogen ions. The hydrogen ions are reduced at the negative electrode, thereby generating hydrogen gas ($H_2$). As a result of this gas, the pressure inside the battery case increases rapidly, and the current interrupt mechanism can be activated at an early stage of overcharging. Therefore, it is possible to achieve a battery that exhibits high reliability (resistance to overcharging).

However, increasing the added quantity of gas generating agent in a battery equipped with this type of CID in order to increase reliability upon overcharging actually had an adverse effect on battery characteristics. Specifically, the IV resistance of the battery increased, leading to a deterioration in input-output characteristics and a deterioration in durability (for example, cycle characteristics, and especially high temperature cycle characteristics).

With these circumstances in mind, an objective of the present invention is to provide a non-aqueous electrolyte secondary battery which is provided with a (pressure-activated) current interrupt mechanism that activates when the pressure inside the battery increases and which achieves both battery characteristics during normal usage and reliability upon overcharging at high levels.

The inventors of the present invention carried out diligent research from a variety of perspectives in order to achieve these conflicting properties. As a result of this research, the inventors of the present invention conceived of the present invention.

That is, the present invention provides a non-aqueous electrolyte secondary battery (for example, a lithium ion secondary battery) in which an electrode body, which includes a positive electrode and a negative electrode, and a non-aqueous electrolyte are housed inside a battery case. The battery case is provided with a current interrupt mechanism that activates when the pressure inside the case increases. In addition, the non-aqueous electrolyte contains cyclohexylbenzene (CHB) and 4,4'-difluorobiphenyl (4,4'-FBP) as additives (gas generating agents) that decompose and generate gas when the battery reaches an overcharged state. In addition, when the overall quantity of the non-aqueous electrolyte is taken to be 100 mass %, a ratio of the content (mass %) of the 4,4'-difluorobiphenyl (W2) relative to the content (mass %) of the cyclohexylbenzene (W1) (W2/W1) is 0.025 to 0.25.

By using these specific gas generating agents at the prescribed mass ratio, the technique disclosed here achieves a superior effect compared to a case in which, for example, a single gas generating agent is used in isolation. That is, by using a mixture of cyclohexylbenzene and 4,4'-difluorobiphenyl at the mass ratio mentioned above, it is possible to maintain or improve battery characteristics (for example, input-output characteristics and cycle characteristics) during normal usage. In addition, the synergistic effect of using these two gas generating agents means that it is possible to stably generate the quantity of gas required to activate the current interrupt mechanism upon overcharging. Therefore, it is possible to achieve a non-aqueous electrolyte secondary battery able to achieve both battery characteristics and resistance to overcharging at high levels.

In a preferred aspect of the non-aqueous electrolyte secondary battery disclosed here, the content of the cyclohexylbenzene (W1) is 3 to 5 mass % relative to the overall mass of non-aqueous electrolyte.

By setting the content of the cyclohexylbenzene (W1) to fall within the range mentioned above, it is possible to generate a large quantity of gas at an earlier stage of overcharging and also possible to more rapidly increase the pressure inside the battery to the pressure at which the current interrupt mechanism activates, even in a relatively high capacity battery having a theoretical capacity of, for example, 10 Ah or higher. As a result, the current interrupt mechanism can be activated properly upon overcharging, and it is possible to achieve a battery having significantly higher resistance to overcharging.

In a preferred aspect of the non-aqueous electrolyte secondary battery disclosed here, the content of the 4,4'-difluorobiphenyl (W2) is 0.1 to 1.5 mass % relative to the overall mass of non-aqueous electrolyte.

By setting the content of the 4,4'-difluorobiphenyl (W2) to fall within the range mentioned above, it is possible to generate a large quantity of gas at an earlier stage of overcharging and also possible to more rapidly increase the pressure inside the battery to the pressure at which the current interrupt mechanism activates, even in a relatively high capacity battery having a theoretical capacity of, for example, 10 Ah or higher. As a result, the current interrupt mechanism can be activated properly upon overcharging, and it is possible to achieve a battery having significantly higher resistance to overcharging.

In a preferred aspect of the non-aqueous electrolyte secondary battery disclosed here, the overall content of the gas generating agents is not higher than 5 mass % relative to the overall mass of non-aqueous electrolyte.

By keeping the content of gas generating agent to the minimum required quantity, it is possible to maintain the battery resistance (for example, the initial IV resistance) at a lower level. Therefore, it is possible to achieve significantly higher battery characteristics (for example, energy density and input-output density) during normal usage.

In a preferred aspect of the non-aqueous electrolyte secondary battery disclosed here, the electrode body is a wound electrode body obtained by overlaying and winding a long positive electrode, a long negative electrode and a long separator in the longitudinal direction.

Batteries provided with wound electrode bodies generally have high energy densities, and therefore have a particular need for measures to prevent overcharging. Therefore, use of the present invention is particularly preferred.

The non-aqueous electrolyte secondary battery disclosed here has the characteristic of being able to achieve both battery characteristics during normal usage and resistance to overcharging at high levels due to the effect achieved by adding the gas generating agents being satisfactorily exhibited. Therefore, by making use of this characteristic, the non-aqueous electrolyte secondary battery of the present invention can be advantageously used in applications that require high resistance to overcharging, high energy density and high output density. An example of such an application is a high output power source for propelling a vehicle. In other words, a vehicle fitted with the non-aqueous electrolyte secondary battery is provided as another aspect disclosed here. Moreover, a vehicle-mounted battery can be in the form of a battery pack in which a plurality of non-aqueous electrolyte secondary batteries are connected in series or in parallel.

DESCRIPTION OF EMBODIMENTS

Preferred embodiments of the present invention will now be explained. Moreover, matters which are essential for carrying out the invention (for example, other constituent elements and ordinary production processes that do not characterize this invention) and which are matters other than those explicitly mentioned in this Description (for example, the constitution of the gas generating agents contained in the non-aqueous electrolyte) are matters that a person skilled in the art could understand to be matters of design on the basis of the background art in this technical field. This invention can be carried out on the basis of the matters disclosed in this Description and common general technical knowledge in this technical field.

In the non-aqueous electrolyte secondary battery disclosed here, an electrode body, which includes a positive electrode and a negative electrode, and a non-aqueous electrolyte are housed in a battery case. In addition, the present invention is characterized in that the non-aqueous electrolyte contains two types of gas generating agent at a prescribed mass ratio. Therefore, other constituent elements are not particularly limited. The constituent elements of the present invention will now be explained in order.

<<Battery case>>

The battery case is a container that houses the electrode body and the non-aqueous electrolyte. The material of the battery case can be a metal material such as aluminum or steel; a resin material such as a poly(phenylene sulfide) resin or a polyimide resin; or the like. Of these, a relatively lightweight metal (for example, aluminum or an aluminum alloy) is preferred from the perspectives of improving heat dissipation properties and increasing energy density. In addition, the shape (external shape) of the battery case may be, for example, hexahedral (cuboid or cubic), circular (cylindrical, coin-shaped or button-shaped), bag-shaped or a deformed shape obtained by processing these shapes.

The battery case of the non-aqueous electrolyte secondary battery disclosed here is provided with a pressure-activated current interrupt mechanism (CID), which forcibly interrupts the charging current when the pressure inside the battery case reaches a prescribed value or higher. In general, if a battery reaches an overcharged state, components in a non-aqueous electrolyte (for example, a non-aqueous solvent) undergo electrolysis and generate gas. The CID interrupts the charging current to the battery when the pressure inside the battery case reaches a prescribed value or higher, thereby halting development of the overcharging.

In the technique disclosed here, the non-aqueous electrolyte contains two specific types of gas generating agent. In this way, a large quantity of gas can be generated as soon as overcharging occurs. As a result, the CID can be activated properly and more rapidly.

<<Positive Electrode>>

The positive electrode is not particularly limited as long as a positive electrode active material is provided therein, but the positive electrode is typically in a form whereby a positive electrode active material layer that contains a positive electrode active material is fixed on a positive electrode current collector.

The positive electrode current collector is preferably an electrically conductive material formed of a metal that exhibits good electrical conductivity (for example, aluminum, nickel or titanium).

The positive electrode active material layer contains at least the positive electrode active material. A variety of materials known to be able to be used as positive electrode active materials in non-aqueous electrolyte secondary batteries can be considered as the positive electrode active material. Preferred examples thereof include layered, spinel type lithium-transition metal composite oxide materials (for example, $LiNiO_2$, $LiCoO_2$, $LiMn_2O_4$, $LiFeO_2$, $LiNi_{0.33}Co_{0.33}Mn_{0.33}O_2$, $LiNi_{0.5}Mn_{1.5}O_4$ and $LiCrMnO_4$) and olivine type materials (for example, $LiFePO_4$). Of these, lithium-nickel-cobalt-manganese composite oxides which have a layered structure and which contain Li, Ni, Co and Mn as constituent elements are preferred from the perspectives of thermal stability and energy density.

In addition to the positive electrode active material, the positive electrode active material layer may, if necessary, contain one or two or more materials able to be used as constituent components of positive electrode active material layers in ordinary non-aqueous electrolyte secondary batteries. Examples of such materials include electrically conductive materials and binders. Examples of electrically conductive materials able to be advantageously used include carbon materials such as a variety of types of carbon black (for example, acetylene black and ketjen black), activated carbon, graphite and carbon fibers. In addition, examples of binders able to be advantageously used include vinyl halide-based resins such as poly(vinylidene fluoride) (PVdF) and polyalkylene oxides such as poly(ethylene oxide) (PEO). In addition, the positive electrode active material layer may also contain a variety of additives (for example, gas generating agents, dispersing agents and thickening agents) as long as the effect of the present invention is not significantly impaired.

The proportion of the positive electrode active material relative to the overall positive electrode active material layer is not particularly limited, but is generally approximately 60 mass % or more (typically 60 to 99 mass %), and preferably approximately 70 to 95 mass %. In cases where an electrically conductive material is used, the proportion of the electrically conductive material relative to the overall positive electrode active material layer can be approximately 2 to 20 mass %, and is preferably approximately 3 to 10 mass %. In cases where a binder is used, the proportion of the binder relative to the overall positive electrode active material layer is not particularly limited, but can be, for example, approximately 0.5 to 10 mass %, and is preferably 1 to 5 mass %.

The mass of positive electrode active material layer provided per unit area of positive electrode current collector (that is, the mass per unit area) is not particularly limited, but should be 3 $mg/cm^2$ or higher (for example, 5 $mg/cm^2$ or higher, and typically 7 $mg/cm^2$ or higher) and 100 $mg/cm^2$ or lower (for example, 70 $mg/cm^2$ or lower, and typically 50 $mg/cm^2$ or lower) on each side of the positive electrode current collector.

In addition, the average thickness of the positive electrode active material layer on each side of the positive electrode current collector is not particularly limited, but should be, for example, 20 µm or higher (typically 40 µm or higher, and preferably 50 µm or higher) and 100 µm or lower (typically 80 µm or lower).

In addition, the density of the positive electrode active material layer is not particularly limited, but should be, for example, 1 $g/cm^3$ or higher (typically 1.5 $g/cm^3$ or higher) and 4 $g/cm^3$ or lower (for example, 3.5 $g/cm^3$ or lower).

By satisfying one or two or more of these preferred properties of the positive electrode active material layer, it is possible to ensure a high battery capacity while maintaining an appropriate quantity of voids in the positive electrode active material layer. In this way, a wide reaction field for a charge carrier or gas generating agent can be ensured. Therefore, it is possible to exhibit significantly higher input-output characteristics during normal usage. In addition, it is possible to rapidly generate a large quantity of gas due to the gas generating agents undergoing rapid oxidative decomposition upon overcharging. As a result, the current interrupt mechanism can activate properly. In addition, it is possible to maintain good electrical conductivity within the positive electrode active material layer and possible to suppress an increase in resistance. Furthermore, it is possible to advantageously maintain the mechanical strength (shape retention properties) of the positive electrode active material layer and achieve good durability.

In a preferred aspect, the maximum charging potential of the positive electrode (vs. $Li/Li^+$) is set to be approximately 4.0 to 4.3 V. Because the oxidation potential of the CHB is approximately 4.6 V (vs. $Li/Li^+$), setting this maximum charging potential means that the difference between the maximum charging potential of the positive electrode and the oxidation potential of the CHB contained in the non-aqueous electrolyte is approximately 0.7 V or lower (typically within the range 0.1 to 0.5 V). In this way, the CHB undergoes oxidative decomposition at an early stage of overcharging. As a result, it is possible to generate gas rapidly. However, if the maximum charging potential of the positive electrode and the oxidation potential of the CHB are too similar (for example, if the difference therebetween is less than 0.1 V), problems can occur in cases where the battery is stored in a high temperature environment or cases where a local and/or momentary increase in voltage occurs. That is, the gas generating agents undergo unwanted oxidative decomposition, which can cause battery swelling and the like.

By setting this maximum charging potential, it is possible for the gas generating agents to properly undergo oxidative decomposition only upon overcharging.

<<Negative Electrode>>

The negative electrode is not particularly limited as long as a negative electrode active material is provided therein, but the negative electrode is typically in a form whereby a negative electrode active material layer that contains a negative electrode active material is fixed on a negative electrode current collector.

The negative electrode current collector is preferably an electrically conductive material formed of a metal that exhibits good electrical conductivity (for example, copper, nickel, titanium or stainless steel).

The negative electrode active material layer contains at least the negative electrode active material. A variety of materials known to be able to be used as negative electrode active materials in non-aqueous electrolyte secondary batteries can be considered as the negative electrode active material. Preferred examples thereof include a variety of carbon materials such as graphite, poorly graphitizable carbon (hard carbon), readily graphitizable carbon (soft carbon), carbon nanotubes, and materials having combinations of these structures. Of these, graphite-based materials are preferred from the perspective of energy density.

In addition to the negative electrode active material, the negative electrode active material layer may, if necessary, contain one or two or more materials able to be used as constituent components of negative electrode active material layers in ordinary non-aqueous electrolyte secondary batteries. Examples of such materials include binders and a variety of additives. Examples of binders able to be advantageously used include styrene butadiene rubbers (SBR), poly(vinylidene fluoride) (PVdF), polytetrafluoroethylene (PTFE), and the like. In addition, a variety of additives, such as thickening agents, dispersing agents and electrically conductive materials, can be used as appropriate. In addition, examples of thickening agents able to be advantageously used include carboxymethyl cellulose (CMC) and methyl cellulose (MC).

The proportion of the negative electrode active material relative to the overall negative electrode active material layer is not particularly limited, but is generally approximately 50 mass % or higher, and preferably 90 to 99 mass % (for example, 95 to 98 mass %). In cases where a binder is used, the proportion of the binder relative to the overall negative electrode active material layer is not particularly limited, but can be, for example, approximately 1 to 10 mass %, and is preferably 1 to 5 mass %. In cases where a thickening agent is used, the proportion of the thickening agent relative to the overall negative electrode active material layer is not particularly limited, but can be approximately 0.1 to 10 mass %, and preferably approximately 1 to 5 mass %.

<<Non-aqueous Electrolyte>>

The non-aqueous electrolyte in the non-aqueous electrolyte secondary battery disclosed here typically contains at least a supporting electrolyte and two specific types of gas generating agent in a non-aqueous solvent. In addition, the non-aqueous electrolyte is generally a liquid at ordinary temperature (for example, 25° C.), and may generally be a liquid in, for example, the environment in which the battery is used (for example, in an environment having a temperature of between −30° C. and 60° C.).

A variety of organic solvents able to be used in non-aqueous electrolytes in ordinary non-aqueous electrolyte secondary batteries (for example, carbonates, ethers, esters, nitrile compounds, sulfone compounds and lactone compounds) can be considered as the non-aqueous solvent. Specific examples thereof include ethylene carbonate (EC), propylene carbonate (PC), diethyl carbonate (DEC), dimethyl carbonate (DMC), ethyl methyl carbonate (EMC). This type of non-aqueous solvent can be a single type or an appropriate combination of two or more types thereof.

In a preferred aspect, a mixture of a solvent having a high dielectric constant and a solvent having a low viscosity is used. By using this type of mixed solvent, high electrical conductivity can be achieved and the electrolyte can be used across a broad temperature range. An example of a solvent having a high dielectric constant is EC, and examples of solvents having low viscosity are DMC and EMC. For example, it is preferable to use a non-aqueous solvent which contains two or more types of carbonate and in which the total volume of these carbonates accounts for 60 vol % or higher (more preferably 75 vol % or higher, and further preferably 90 vol % or higher) of the overall volume of the non-aqueous solvent.

It is possible to appropriately select a supporting electrolyte similar to those used in ordinary non-aqueous electrolyte secondary batteries as the supporting electrolyte as long as the supporting electrolyte contains a charge carrier (for example, lithium ions, sodium ions, magnesium ions, and the like. Lithium ions in the case of a lithium ion secondary battery). Specific examples of the supporting electrolyte include lithium salts such as $LiPF_6$, $LiBF_4$, $LiClO_4$, $LiAsF_6$, $Li(CF_3SO_2)_2N$ and $LiCF_3SO_3$. This type of supporting electrolyte may be a single supporting electrolyte or a combination of two or more types thereof. A particularly preferred example of a supporting electrolyte is $LiPF_6$. In addition, it is preferable for the concentration of the supporting electrolyte to be 0.7 to 1.3 mol/L relative to the overall non-aqueous electrolyte.

In the technique disclosed here, two specific types of compound are contained as gas generating agents. Specifically, cyclohexylbenzene (CHB) is contained as a first gas generating agent, and 4,4'-difluorobiphenyl (4,4'-FBP) is contained as a second gas generating agent. These compounds decompose and generate gas when the prescribed battery pressure is exceeded. More specifically, each of these compounds has and oxidation potential (vs. $Li/Li^+$) that is no lower than the maximum charging potential (vs. $Li/Li^+$) of the positive electrode, and in cases where this potential is exceeded (that is, in cases where the battery is in an overcharged state), these compounds undergo oxidative decomposition and generate gas.

The CHB that is the first gas generating agent holds hydrogen ($—CH_2$ (methylene group) moiety) in a cyclohexyl group, and therefore readily forms a conjugated system and facilitates electron exchange. Therefore, it is thought that the CHB exhibits high gas generation performance. Meanwhile, according to investigations by the inventors of the present invention, cyclohexyl groups and phenyl groups ($—C_6H_5$ moieties) form at high probability planar structures that are almost identical. Therefore, it is thought that the probability of collisions between monomers is limited, and that when CHB is used in isolation, it is difficult for an oxidation (oxidative polymerization) reaction to occur rapidly upon overcharging.

The 4,4'-FBP that is the second gas generating agent exhibits lower gas generation performance in isolation than the CHB. However, according to investigations by the inventors of the present invention, using the 4,4'-FBP in combination with the CHB at quantities whereby the 4,4'-FBP/CHB mass ratio is 0.025 to 0.25 (and preferably 0.025 to 0.125) achieves the effect of facilitating an oxidation (oxidative polymerization) reaction. That is, it is difficult for straight chain connections to be made, and it is possible for benzene rings to be present in the same planar structure. Therefore, it is possible to increase the probability of collisions between monomers, thereby assisting the oxidative decomposition (oxidative polymerization) reaction and increasing the reaction speed.

Therefore, according to the technique disclosed here, it is thought that it is possible to rapidly generate a large quantity of gas at an early stage of overcharging. As a result, the current interrupt mechanism can be activated properly and rapidly, thereby greatly improving the reliability of the battery.

Furthermore, according to investigations by the inventors of the present invention, by blending the CHB and the 4,4'-FBP at the mass ratio mentioned above, it is possible to prevent a deterioration in battery characteristics during normal usage. For example, it is possible to reduce the initial IV resistance and improve cycle characteristics in high temperature environments compared to cases in which a single type of gas generating agent is used in isolation or cases in which a combination of CHB and another fluorobiphenyl (for example, a monofluorobiphenyl) is used. As a result, it is possible to achieve a non-aqueous electrolyte secondary battery which achieves two conflicting properties, namely battery characteristics during normal usage and reliability upon overcharging.

Moreover, the gas generating agent may be constituted substantially from the two types of gas generating agent mentioned above (CHB and 4,4'-FBP), but may also contain other types of gas generating agent as long as the effect of the present invention is not significantly impaired. Specifically, it is possible to use biphenyl compounds, alkylbiphenyl compounds, cycloalkylbenzene compounds other than CHB, alkylbenzene compounds, organophosphorus compounds, carbonate compounds, cyclic carbamate compounds, alicyclic hydrocarbons, and the like.

The content of cyclohexylbenzene (W1) in the non-aqueous electrolyte depends on settings such as the size and capacity of the battery and the operating pressure of the current interrupt mechanism, and is therefore not particularly limited as long as the mass ratio mentioned above is satisfied. For example, in the case of a relatively large capacity battery having a theoretical capacity of 10 Ah or greater, the content of cyclohexylbenzene should be 2 mass % or higher (typically 3 mass % or higher, for example 3.5 mass % or higher) relative to 100 mass % of the non-aqueous electrolyte in order to generate a large quantity of gas at an early stage of overcharging. In addition, the content of cyclohexylbenzene should be 6 mass % or lower (typically 5 mass % or lower, for example 4 mass % or lower) relative to 100 mass % of the non-aqueous electrolyte in order to achieve excellent battery characteristics during normal usage. By setting the content of cyclohexylbenzene to fall within this range, the effect of the present invention can be exhibited at a high level.

The content of 4,4'-difluorobiphenyl (W2) in the non-aqueous electrolyte depends on settings such as the size and capacity of the battery and the operating pressure of the current interrupt mechanism, and is therefore not particularly limited as long as the mass ratio mentioned above is satisfied. For example, in the case of a relatively large capacity battery having a theoretical capacity of 10 Ah or greater, the content of 4,4'-difluorobiphenyl should be 0.01 mass % or higher (typically 0.05 mass % or higher and preferably 0.1 mass % or higher, for example 0.2 mass % or higher) and 2 mass % or lower (typically 1.5 mass % or lower, for example 1 mass % or lower, and especially 0.5 mass % or lower) relative to 100 mass % of the non-aqueous electrolyte in order to assist oxidative decomposition of the CHB to a high level.

In addition, the total content of gas generating agents (typically W1+W2) depends on settings such as the size and capacity of the battery and the operating pressure of the current interrupt mechanism, and is therefore not particularly limited as long as the mass ratio mentioned above is satisfied. For example, in the case of a relatively large capacity battery having a theoretical capacity of 10 Ah or greater, the total content of gas generating agents should be 2 mass % or higher (typically 3 mass % or higher, for example 3.5 mass % or higher) relative to 100 mass % of the non-aqueous electrolyte in order to ensure a sufficient quantity of gas to activate the CID. By setting the total content of gas generating agents to fall within this range, it is possible to generate a sufficient quantity of gas upon overcharging and properly activate the CID. However, in general because gas generating agents are components that can cause resistance to battery reactions, there are concerns that battery characteristics (for example, energy density and input-output characteristics) will deteriorate if excessive quantities of gas generating agents are added. From this perspective, the content of gas generating agents should be kept to the minimum required, that is generally 6 mass % or lower (and preferably 5 mass % or lower, for example 4.5 mass % or lower). By setting the content of gas generating agents to fall within this range, significantly better battery characteristics can be exhibited during normal usage.

Moreover, in addition to the components mentioned above (the supporting electrolyte and the gas generating agents), the non-aqueous electrolyte may, if necessary, also contain a variety of additives as long as the effect of the present invention is not significantly impaired. Examples of such additives include film-forming agents such as vinylene carbonate (VC), vinylethylene carbonate (VEC), fluoroethylene carbonate (FEC) and lithium bis(oxalato)borate (Li[B$(C_2O_4)_2$]); surfactants; dispersing agents and thickening agents.

Although not intending to place particular limitations on the present invention, an example of a non-aqueous electrolyte secondary battery in which a flat wound electrode body and a non-aqueous electrolyte are housed in a flat rectangular battery case will be explained as an embodiment of the present invention. Moreover, in the drawings shown below, members/parts that perform the same action are denoted by the same symbols, and duplicate explanations will be omitted or simplified. Dimensions shown in the drawings (lengths, widths, thicknesses, and so on) do not necessarily reflect actual dimensions.

Figure 1:
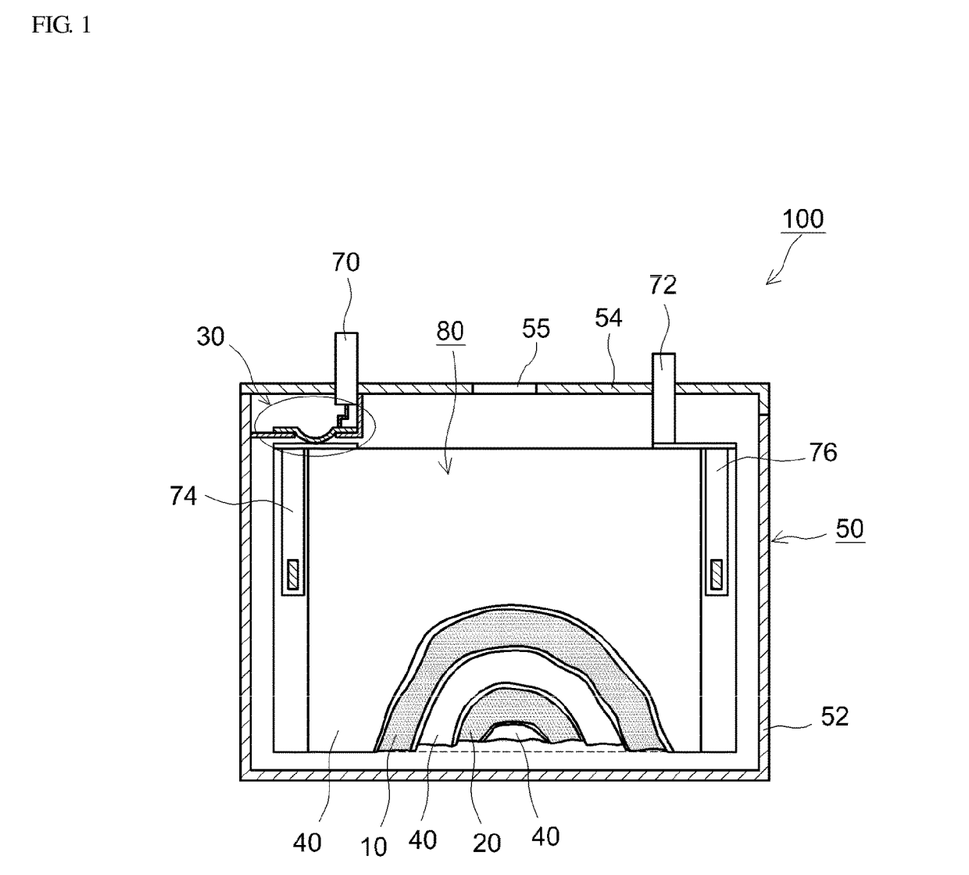
FIG. 1 is a longitudinal sectional view that schematically illustrates a non-aqueous electrolyte secondary battery according to one embodiment of this invention.

FIG. 1 is a longitudinal sectional view that schematically illustrates the cross sectional structure of a non-aqueous electrolyte secondary battery 100. In this non-aqueous electrolyte secondary battery 100, an electrode body (a wound electrode body) 80, which is obtained by flatly winding a long positive electrode sheet 10 and a long negative electrode sheet 20 via a separator sheet 40, and a non-aqueous electrolyte (not shown) are housed in a flat box-shaped battery case 50. In general, batteries provided with this type of wound electrode body are high capacity batteries, and measures for tackling overcharging are therefore particularly important. Therefore, this type of battery is particularly preferred as an application of the present invention.

The battery case 50 is provided with a flat rectangular (box-shaped) battery case main body 52, the top of which is open, and a lid 54 that seals this open part. The upper surface (that is, the lid 54) of the battery case 50 is provided with a positive electrode terminal 70 for external connections, which is electrically connected to the positive electrode of the wound electrode body 80, and a negative electrode terminal 72 that is electrically connected to the negative electrode of the wound electrode body 80. The lid 54 is also provided with a safety valve 55 for discharging gas generated inside the battery case 50 to outside the battery case 50.

Furthermore, a current interrupt mechanism 30 that activates when the pressure inside the battery case increases is provided inside the battery case 50 between the wound electrode body 80 and the positive electrode terminal 70 that is attached to the lid 54. The current interrupt mechanism 30 is constituted so as to interrupt the charging current by cutting an electrically conductive path from at least one of the electrode terminals (that is, the positive electrode terminal 70 and/or the negative electrode terminal 72) to the wound electrode body 80 when the pressure inside the battery case 50 increases. This embodiment is constituted so as to cut the electrically conductive path from the positive electrode terminal 70 to the wound electrode body 80 when the pressure inside the battery case 50 increases.

Figure 2:
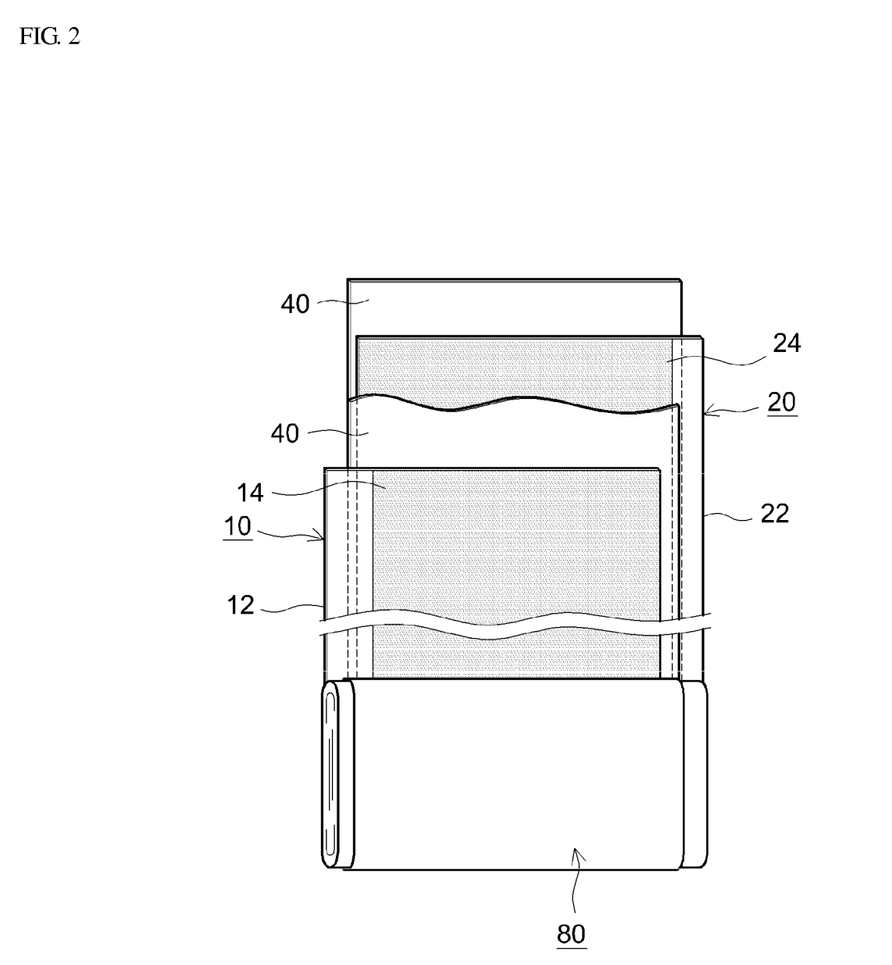
FIG. 2 is a schematic diagram that shows the constitution of a flat wound electrode body according to one embodiment.

The flat wound electrode body 80 and a non-aqueous electrolyte (not shown) are housed in the battery case 50. FIG. 2 is a schematic diagram that shows the constitution of the flat wound electrode body 80. The wound electrode body 80 is provided with the long sheet-like positive electrode (the positive electrode sheet) 10 and the long sheet-like negative electrode (negative electrode sheet) 20. The positive electrode sheet 10 is provided with a long positive electrode current collector 12 and a positive electrode active material layer 14, which is provided on at least one surface (and typically both surfaces) of the long positive electrode current collector 12 and which is formed in the longitudinal direction of the long positive electrode current collector 12. The negative electrode sheet 20 is provided with a long negative electrode current collector 22 and a negative electrode active material layer 24, which is provided on at least one surface (and typically both surfaces) of the long negative electrode current collector 22 and which is formed in the longitudinal direction of the long negative electrode current collector 22. In addition, two long sheet-like separators (separator sheets) 40 are disposed as insulating layers that prevent direct contact between the positive electrode active material layer 14 and the negative electrode active material layer 24.

A porous sheet, non-woven fabric and the like formed of a resin such as polyethylene (PE), polypropylene (PP), a polyester, cellulose or a polyamide can be used as the separator sheet 40.

A tightly laminated wound core part, which is obtained by overlaying the positive electrode active material layer 14 formed on the surface of the positive electrode current collector 12 and the negative electrode active material layer 24 formed on the surface of the negative electrode current collector 22, is formed in the central part in the width direction, which is specified as the direction from one edge towards the other edge in the winding axis direction of the wound electrode body 80. In addition, a part in which the positive electrode active material layer is not formed on the positive electrode sheet 10 and a part in which the negative electrode active material layer is not formed on the negative electrode sheet 20 protrude outwards from the wound core part at both edges of the wound core part in the winding axis direction of the wound electrode body 80. In addition, a positive electrode current collector 74 is provided on the protruding part on the positive electrode side (that is, the part in which the positive electrode active material layer is not formed), a negative electrode current collector 76 is provided on the protruding part on the negative electrode side (that is, the part in which the negative electrode active material layer is not formed), the positive electrode terminal 70 is electrically connected to the positive electrode current collector 74 (see FIG. 1), and the negative electrode terminal 72 is electrically connected to the negative electrode current collector 76 (see FIG. 1).

The battery disclosed here can be used in a variety of applications, but is characterized by achieving both reliability upon overcharging and good battery characteristics (for example, high energy density, high input-output density and excellent cycle characteristics) during normal usage. Therefore, examples of preferred applications for the features described here include high capacity type non-aqueous electrolyte secondary batteries having a theoretical capacity of 10 Ah or higher (and especially 20 Ah or higher) and, for example, 100 Ah or lower; non-aqueous electrolyte secondary batteries able to be used in charging/discharging cycles that include high rate charging/discharging, such as 10 C or higher (for example, 10 to 50 C), or 20 C or higher (for example, 20 to 50 C); and non-aqueous electrolyte secondary batteries able to be used in high temperature environments (for example, 50 to 85° C.).

By utilizing characteristics such as those mentioned above, the battery disclosed here can be advantageously used as, for example, a motive power source fitted to a vehicle. The type of vehicle is not particularly limited, but examples thereof include plug-in hybrid vehicles (PHV), hybrid vehicles (HV), electric vehicles (EV), electric trucks, electric bicycles, electrically assisted bicycles, electric wheelchairs and electric trains.

Several working examples relating to the present invention will now be explained, but the present invention is in no way limited to these specific examples.

[Construction of Non-aqueous Electrolyte Secondary Battery]

First, a positive electrode active material slurry was prepared by placing $LiNi_{0.33}Mn_{0.33}Co_{0.33}O_2$ (LNCM) as a positive electrode active material, acetylene black (AB) as an electrically conductive material and poly(vinylidene fluoride) (PVdF) as a binder in a mixer so that the LNCM:AB:PVdF mass ratio was 90:8:2, and then kneading while adjusting the viscosity by means of N-methylpyrrolidone (NMP). A positive electrode sheet (overall thickness: 170 μm active material layer density: 3 g/cm$^3$) having a positive electrode active material layer on both surfaces of a positive electrode current collector was prepared by coating this slurry on both surfaces of an aluminum foil (a positive electrode current collector) having a thickness of 15 μm drying the slurry, and then pressing.

Next, a negative electrode active material slurry was prepared by placing natural graphite (C) as a negative electrode active material, a styrene-butadiene rubber (SBR) as a binder and carboxymethyl cellulose (CMC) as a thickening agent in a mixer so that the C:SBR:CMC mass ratio was 98:1:1, and then kneading while adjusting the viscosity by means of ion exchanged water. A negative electrode sheet having a negative electrode active material layer on both surfaces of a negative electrode current collector was prepared by coating this slurry on both surfaces of a long copper foil (a negative electrode current collector) having a thickness of 10 μm, drying the slurry, and then pressing.

A wound electrode body was prepared by laminating and winding the thus prepared positive electrode sheet and negative electrode sheet together with two separator sheets (here, a separator having a three layer structure obtained by laminating a polypropylene (PP) sheet on both surfaces of a polyethylene (PE) sheet was used).

Next, the thus prepared wound electrode body and a non-aqueous electrolyte were housed in a cylindrical aluminum battery case, and an open part was formed in the battery case. Moreover, the non-aqueous electrolyte was one obtained by dissolving $LiPF_6$ as a supporting electrolyte at a concentration of 1.1 mol/L in a mixed solvent containing ethylene carbonate (EC), dimethyl carbonate (DMC) and ethylmethyl carbonate (EMC) at a EC:DMC:EMC volume ratio of 30:40:30, and further dissolving prescribed gas generating agents at the proportions shown in Table 1. In addition, the battery case was provided with a safety mechanism that physically interrupts the current flow when the pressure inside the battery reaches a prescribed value or higher. In this way, non-aqueous electrolyte secondary batteries (Examples 1 to 11) in which only the type and/or content of gas generating agents differed were prepared.

TABLE 1

| | First (W1) Cyclohexyl-benzene | 4,4'-difluoro-biphenyl | 4-fluoro-biphenyl | 2-fluoro-biphenyl | Gas generating agent content ratio (W2/W1) |
|---|---|---|---|---|---|
| | | Second (W2) | | | |
| Example 1 | 4 | — | — | — | 0 |
| Example 2 | 4 | 0.1 | — | — | 0.025 |
| Example 3 | 4 | 0.5 | — | — | 0.125 |
| Example 4 | 4 | 1 | — | — | 0.250 |
| Example 5 | 4 | 2 | — | — | 0.500 |
| Example 6 | 0 | 4 | — | — | — |
| Example 7 | 2 | 2 | — | — | 1.000 |
| Example 8 | 2 | — | 2 | — | 1.000 |
| Example 9 | 4 | — | 0.5 | — | 0.125 |
| Example 10 | 2 | — | — | 2 | 1.000 |
| Example 11 | 4 | — | — | 0.5 | 0.125 |

| | Battery characteristics | | | |
|---|---|---|---|---|
| | High rate discharge IV resistance (%) | High temp. cycle capacity retention rate (%) | Overcharging test | |
| | | | Quantity of gas generated ($cm^3$) | CID deployment properties |
| Example 1 | 100 | 91 | 0.77 | OK |
| Example 2 | 98 | 92 | 0.82 | OK |
| Example 3 | 97 | 92 | 0.77 | OK |
| Example 4 | 96 | 93 | 0.69 | OK |
| Example 5 | 95 | 95 | 0.30 | NG |
| Example 6 | 88 | 98 | 0.29 | NG |
| Example 7 | 94 | 93 | 0.35 | NG |
| Example 8 | 99 | 91 | 0.57 | NG |
| Example 9 | 100 | 90 | 0.76 | OK |
| Example 10 | 99 | 91 | 0.46 | NG |
| Example 11 | 101 | 90 | 0.75 | OK |

In addition, the thus constructed batteries were evaluated in terms of battery characteristics and resistance to overcharging.

[Measurement of IV Resistance Upon High Rate Discharging]

The thus prepared non-aqueous electrolyte secondary batteries were adjusted to a SOC of 60%, and then discharged for 10 seconds at a rate of 10 C in an environment at 25° C., and the IV resistance was calculated from the drop in voltage over this period. The results are shown in the corresponding column in Table 1 and FIG. 3. Here, values are shown as relative values (%), with the IV resistance of Example 1 being 100.

Figure 3:
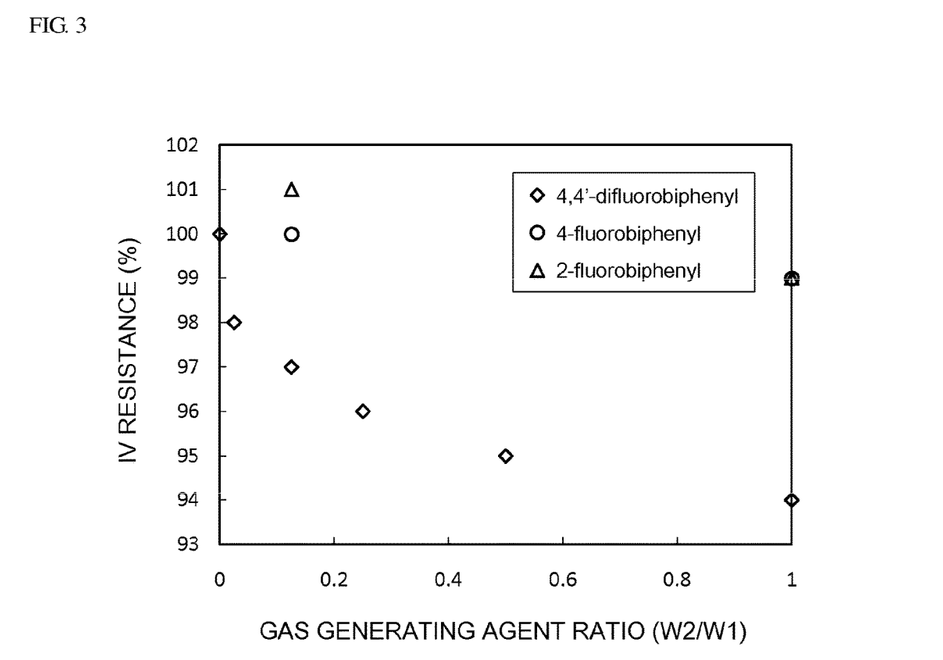
FIG. 3 is a graph that shows the relationship between the content ratio of gas generating agents (W2/W1) and the IV resistance during high rate discharging.

As shown in Table 1 and FIG. 3, examples in which 4-fluorobiphenyl or 2-fluorobiphenyl were used exhibited almost equal IV resistance values even if the addition ratio (W2/W1) was altered. Conversely, it was found that examples in which 4,4'-difluorobiphenyl was added according to the present invention exhibited a decrease in IV resistance as the addition ratio (W2/W1) increased, regardless of whether the total added quantity of gas generating agent was increased.

[Measurement of High Temperature Cycle Characteristics]

In a thermostatic chamber at 60° C., the thus constructed non-aqueous electrolyte secondary batteries were subjected to constant current charging at a constant current of 1 C until the battery voltage reached 4.1 V, and then subjected to constant voltage (CV) charging at the same voltage until the charging current reached 1/10 C, thereby adjusting the SOC to 100%. Next, the batteries were subjected to constant current (CC) discharging at a constant current of 1 C until the battery voltage reached 3.0 V, and the discharge capacity during this CC discharging was taken to be the initial capacity. After repeating this charging and discharging cycle (CCCV charging→CC discharging) 350 times, the discharge capacity following high temperature cycles was measured in the same way as the initial capacity. In addition, the high temperature cycle characteristics (%) were calculated on the basis of calculation formula (1) below. The results are shown in the corresponding column in Table 1 and FIG. 4.

Figure 4:
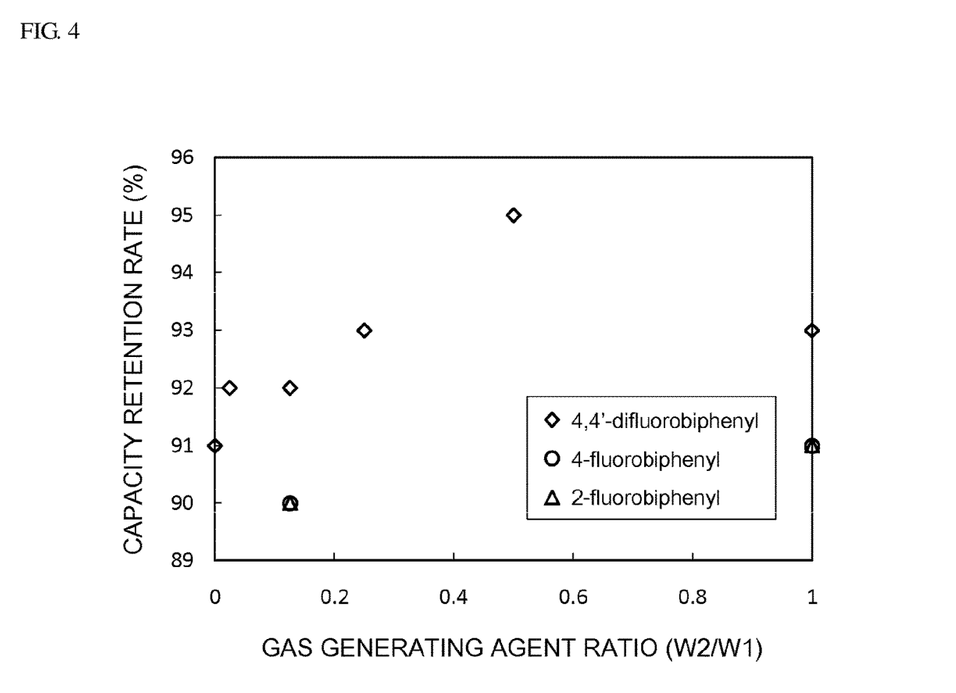
FIG. 4 is a graph that shows the relationship between the content ratio of gas generating agents (W2/W1) and capacity retention rate during high temperature storage.

High temperature cycle characteristics (%)=(discharge capacity following high temperature cycles/initial capacity)×100     (1)

As shown in Table 1 and FIG. 4, examples in which 4-fluorobiphenyl or 2-fluorobiphenyl were used exhibited almost equal capacity retention rates even if the addition ratio (W2/W1) was altered. Conversely, it was found that examples in which 4,4'-difluorobiphenyl was added according to the present invention exhibited an improvement in capacity retention rate as the addition ratio (W2/W1) increased, regardless of whether the total added quantity of gas generating agent was increased.

[Overcharging Test]

In a thermostatic chamber at 60° C., the thus constructed non-aqueous electrolyte secondary batteries were adjusted to a SOC of 100%, after which charging was continued at a constant current of 1 C until the SOC reached 140% (that is, until an overcharged state was reached), and it was evaluated whether or not the current interrupt mechanism activated properly. The results are shown in the corresponding column in Table 1. Moreover, in Table 1, "OK" indicates that the current interrupt mechanism activated properly and "NG" indicates that the current interrupt mechanism was not activated.

[Measurement of Quantity of Gas Generated]

In addition, laminate batteries having the same constitutions as Examples 1 to 11 were also prepared, and measured in terms of quantity of gas generated upon overcharging. Specifically, the volume of a constructed non-aqueous electrolyte secondary battery was measured using the Archimedes method. Next, the battery was adjusted to a SOC of 100%, after which charging was continued at a constant current of 1 C until the SOC reached 140%. Next, the volume of the battery at a SOC of 140% was measured again using the Archimedes method. The quantity of gas generated upon overcharging was then calculated by subtracting the volume ($cm^3$) of the cell prior to overcharging from the volume ($cm^3$) of the cell following overcharging. The results are shown in the corresponding column in Table 1 and FIG. 5.

Figure 5:
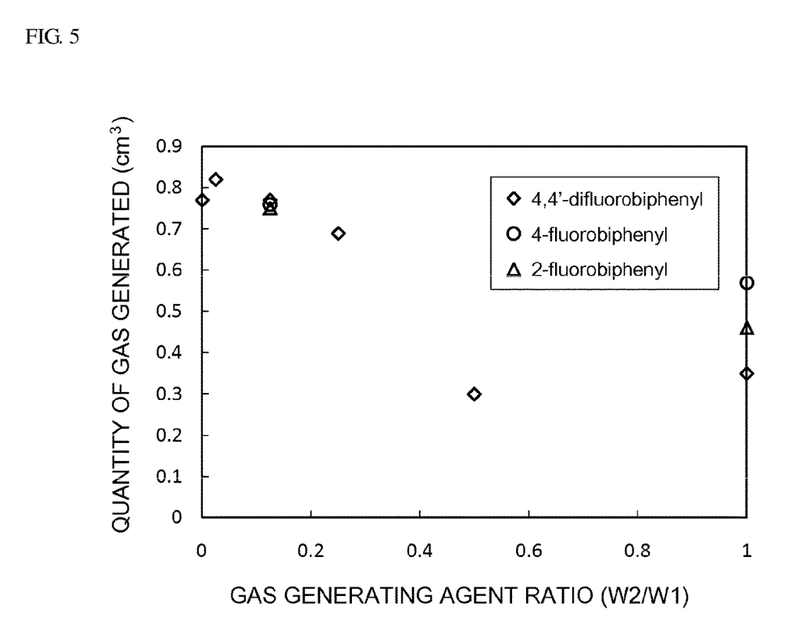
FIG. 5 is a graph that shows the relationship between the content ratio of gas generating agents (W2/W1) and the quantity of gas generated upon overcharging.

As shown in Table 1 and FIG. 5, it was generally found that as the addition ratio (W2/W1) increased, the quantity of gas generated tended to decrease.

These results will now be summarized.

As shown in Table 1 and FIGS. 3 to 5, Example 1, in which only 4 mass % of CHB was added (4,4'-FBP/CHB=0) was able to generate a large quantity of gas upon overcharging and achieve high resistance to overcharging. However, despite the content of gas generating agent being kept down to 4 mass %, the IV resistance was relatively high and the capacity retention rate following high-temperature cycles was low.

In Example 5, in which 4 mass % of CHB and 2 mass % of 4,4'-FBP were added (4,4'-FBP/CHB=0.5), Example 6, in which only 4 mass % of 4,4'-FBP was added and Example 7, in which 2 mass % of CHB and 2 mass % of 4,4'-FBP were added (4,4'-FBP/CHB=1), a relatively low quantity of gas was generated upon overcharging and it was difficult in some cases to properly activate the current interrupt mechanism at an early stage of overcharging.

In addition, Example 9 and Example 11, which used a monofluorobiphenyl (4-fluorobiphenyl or 2-fluorobiphenyl) as the second gas generating agent, were able to ensure a generated quantity of gas upon overcharging that was similar the quantity generated in cases where 4,4'-FBP was used. However, the IV resistance was relatively high, and the high temperature cycle characteristics were low.

Examples 2 to 4, which were used as reference examples and in which 4 mass % of CHB and 0.1 to 1 mass % of 4,4'-FBP were added as gas generating agents (4,4'-FBP/CHB=0.025 to 0.25), were able to generate a large quantity of gas upon overcharging and achieve high resistance to overcharging. In particular, it was understood that by adding these two gas generating agents at a 4,4'-FBP/CHB mass ratio of 0.025 to 0.125 (for example, by adding 4 mass % of CHB and 0.1 to 0.5 mass % of 4,4'-FBP), it is possible to generate an extremely large quantity of gas, namely 0.75 $cm^3$ or more, upon overcharging and activate the current interrupt mechanism at an earlier stage of overcharging. Furthermore, Examples 2 to 4 exhibited low IV resistance and good high temperature cycle characteristics. Therefore, it was understood that it is possible to achieve battery characteristics during normal usage (for example, input-output characteristics and cycle characteristics) and resistance to overcharging at high levels. These results indicate the technical significance of the present invention.

Moreover, the inventors of the present invention have surmised that the reasons for such a phenomenon occurring are as follows. That is, it is thought that CHB holds hydrogen in cyclohexyl groups and enables high gas generation performance. Meanwhile, because cyclohexyl groups and phenyl groups readily form at high probability planar structures that are almost identical, it is thought that the probability of collisions between monomers is limited and that when CHB is used in isolation, it is difficult for an oxidative decomposition (oxidative polymerization) reaction to occur rapidly upon overcharging. 4,4'-FBP exhibits lower gas generation performance than CHB, but it is thought that by incorporating CHB at such a quantity that the (4,4'-FBP/CHB) mass ratio is 0.025 to 0.25, it is possible to increase the probability of collisions between monomers, thereby increasing the speed of the oxidative decomposition (oxidative polymerization) reaction of the gas generating agents.

The present invention has been explained in detail above, but the embodiments and working examples given above are merely indicative, and the invention disclosed here encompasses modes obtained by variously modifying or altering the specific examples shown above.

REFERENCE SIGNS LIST

10: Positive electrode sheet (positive electrode)
12: Positive electrode current collector
14: Positive electrode active material layer
20: Negative electrode sheet (negative electrode)
22: Negative electrode current collector
24: Negative electrode active material layer
30: Current interrupt mechanism
40: Separator sheet (separator)
50: Battery case
52: Battery case main body
54: Lid
55: Safety valve
70: Positive electrode terminal
72: Negative electrode terminal
74: Positive electrode current collector sheet
76: Negative electrode current collector sheet
80: Flat wound electrode body
100: Non-aqueous electrolyte secondary battery

The invention claimed is:

1. A non-aqueous electrolyte secondary battery in which an electrode body, which includes a positive electrode and a negative electrode, and a non-aqueous electrolyte are housed in a battery case, wherein
the battery case is provided with a current interrupt mechanism that activates when the pressure inside the case increases, the non-aqueous electrolyte contains cyclohexylbenzene and 4,4'-difluorobiphenyl as gas generating agents that decompose and generate gas when the battery reaches an overcharged state, when the overall quantity of the non-aqueous electrolyte is taken to be 100 mass %, a ratio of a content (mass %) of the 4,4'-difluorobiphenyl (W2) relative to a content (mass %) of the cyclohexylbenzene (W1) (W2/W1) is 0.025 to 0.25, and the content of the cyclohexylbenzene (W1) is 2 to 6 mass % relative to the overall mass of the non-aqueous electrolyte.

2. The non-aqueous electrolyte secondary battery according to claim 1, wherein the content of the cyclohexylbenzene (W1) is 3 to 5 mass % relative to the overall mass of non-aqueous electrolyte.

3. The non-aqueous electrolyte secondary battery according to claim 1, wherein the content of the 4,4'-difluorobiphenyl (W2) is 0.1 to 1.5 mass % relative to the overall mass of non-aqueous electrolyte.

4. The non-aqueous electrolyte secondary battery according to claim 1, wherein the overall content of the gas generating agents is not higher than 5 mass % relative to the overall mass of non-aqueous electrolyte.

5. The non-aqueous electrolyte secondary battery according to claim 1, wherein the electrode body is a wound electrode body that includes a long positive electrode and a long negative electrode.

* * * * *